Dec. 18, 1923.
H. F. MATSON
1,478,241
SAFETY STEERING DEVICE FOR CARS
Filed Feb. 15, 1923   2 Sheets-Sheet 1
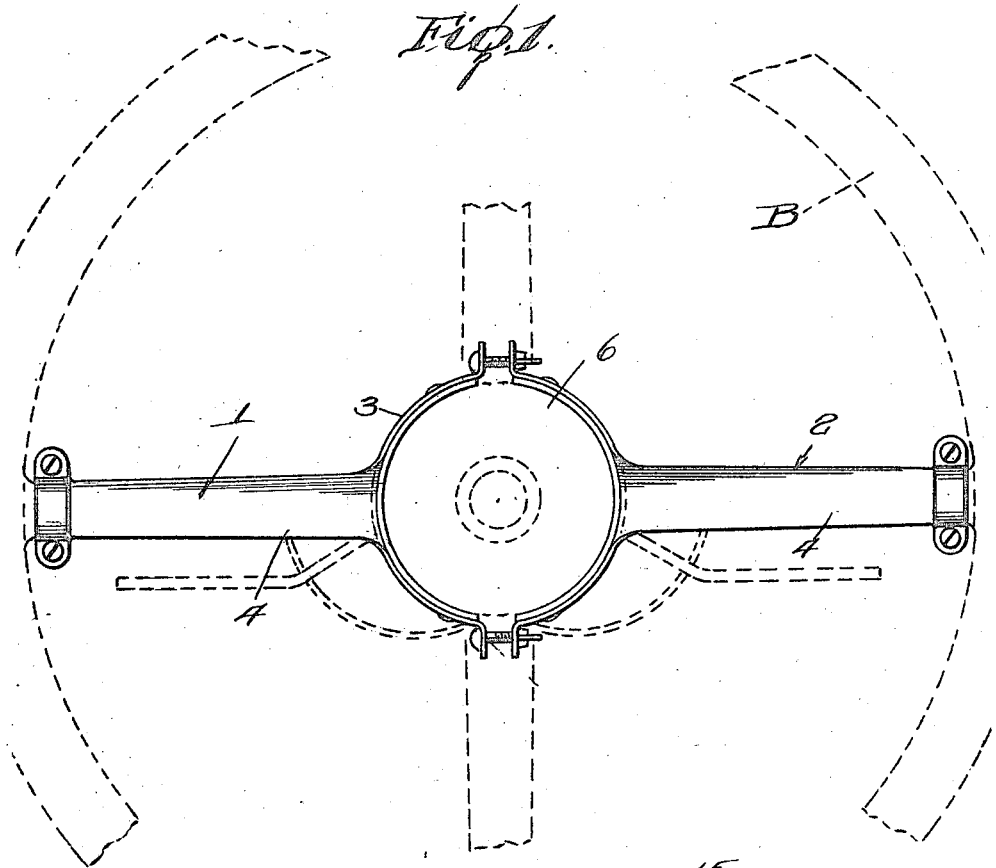
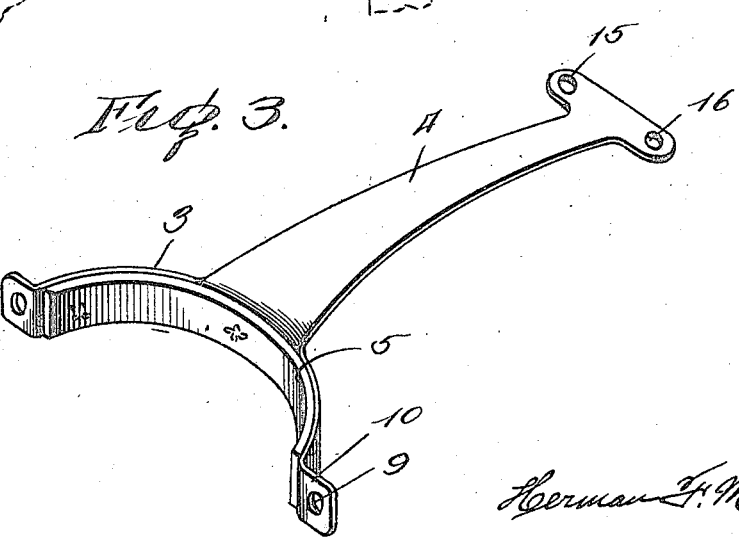
Inventor
Herman F. Matson
John P. Duffie
Attorney Dec. 18, 1923.

H. F. MATSON

SAFETY STEERING DEVICE FOR CARS

Filed Feb. 15, 1923   2 Sheets-Sheet 2

1,478,241

Inventor
Herman F. Matson

Attorney

Patented Dec. 18, 1923.

1,478,241

UNITED STATES PATENT OFFICE.

HERMAN F. MATSON, OF LA CROSSE, WISCONSIN.

SAFETY STEERING DEVICE FOR CARS.

Application filed February 15, 1923. Serial No. 619,181.

*To all whom it may concern:*

Be it known that I, HERMAN F. MATSON, a citizen of the United States, residing at La Crosse, in the county of La Crosse and State of Wisconsin, have invented certain new and useful Improvements in Safety Steering Devices for Cars, of which the following is a specification.

This invention relates to new and useful improvements in safety steering devices for Ford cars, and has for its principal object to provide a device of this character which may be attached to the steering wheel and post and hold the former steady or against turning in the hand when suddenly striking or encountering ruts, stones or other obstructions in driving on rough or uneven roads or streets.

A further object of my invention is to provide an attachment or device of this character which is simple and economical in construction and may be easily applied.

With the foregoing and other objects in view that will appear as the nature of my invention is better understood, the same consists in the novel features of construction, combination and arrangement of parts illustrated in the drawings and more particularly pointed out in the appended claim.

In the accompanying drawings, which are for illustrative purposes only and are therefore not drawn to scale:—

Figure 1 is a plan view, illustrating the application of my invention, the steering wheel and steering post being shown in dotted lines.

Figure 3 is a detail perspective view of one member or section of my safety steering device and Figure 4 a central vertical longitudinal section thereof, the outer ends of the arms broken away.

Figure 2:
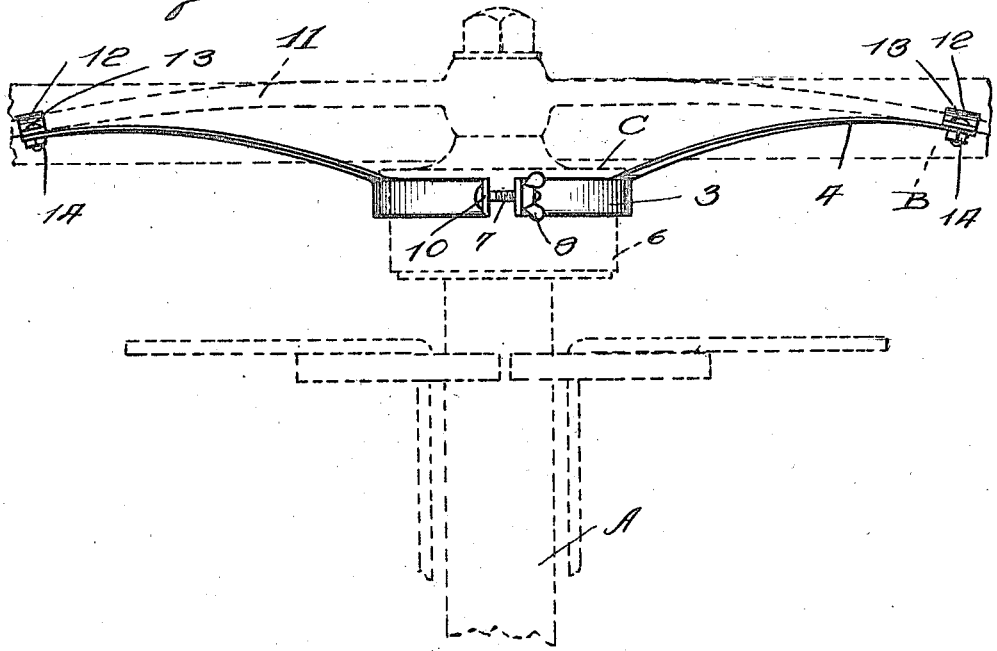
Figure 2 is a side elevation of Figure 1.
Figure 4:
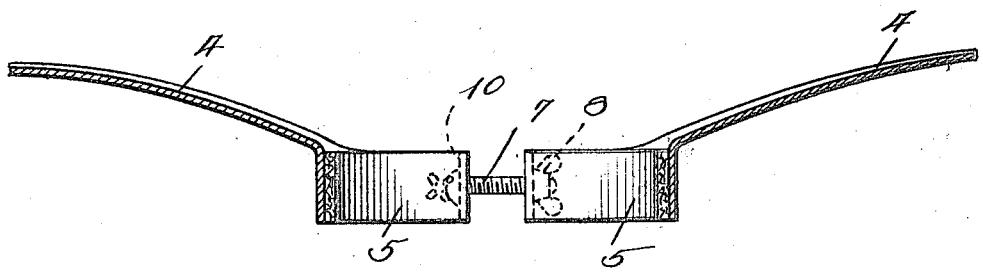

Referring to the drawings for a more particular description of my invention and in which drawings like parts are designated by like reference characters throughout the several views, A designates the steering post and B the steering wheel of a Ford car, which are of the usual construction and shown in dotted lines. C designates my safety steering device or attachment, as a whole, comprising two corresponding sections 1 and 2, respectively, each consisting of an approximately semi-circular body portion 3 and an outwardly extending upwardly curved arm 4. The body portion of each section aforesaid is provided with a friction band 5 which fits over or embraces the upper end, as 6, of the steering post, and are held in frictional engagement therewith by the screws and wing nuts 7 and 8, respectively, the former extending through corresponding transverse apertures 9 in the outwardly bent ears or lugs 10 formed at opposite ends of said body portions and the latter screwing on the threaded ends or shanks of the screws. It will be apparent that the frictional engagement of the friction bands with the steering post may be varied or regulated, as desired, by suitably adjusting the wing nuts 8.

The outer or free ends of the arms 4 of the sections 1 and 2 of my device terminate adjacent the outer ends of the steering wheel spokes 11 and are fastened or secured thereto by the clamping plates 12, which fit over and extend across said spokes, and the screws and nuts 13 and 14, respectively, the former extending through corresponding transverse openings or apertures 15 and 16 formed in the outer ends of the clamping plates and arms 4 and the latter screwing on said screws against the under or bottom surfaces of said arms.

Through the use of my device the steering wheel is held steady or against sudden turning in striking or encountering stones, ruts or other obstacles in driving over rough or uneven roads or streets and many accidents due to this cause every year may be eliminated.

From the foregoing description taken in connection with the drawings, it is thought that the construction, operation and advantages of my invention will be readily understood without requiring a more extended explanation.

Having described my invention, what I claim as new and desire to secure by Letters Patent, is:—

A device adapted to be used in combination with a steering wheel and journal bearing for stiffening the journal comprising a piece of sheet metal having an arcuate body portion and an arm portion disposed radially therefrom and located at the arcuate edge thereof and at a point midway between the ends thereof, said arm having at its outer end a cross head portion provided at its ends with bolt openings, a clamping member mounted upon the cross head portion and secured thereto by bolts passing through said openings, means for frictionally securing the arcuate body to the exterior surface of the bearing, the cross head portion and the clamping member adapted to receive between them a spoke of the wheel whereby the spoke is completely circumscribed and is tightly clamped by the bolts between the cross head portion and the clamping member.

In testimony whereof I affix my signature.

HERMAN F. MATSON.